United States Patent [19]

Vines

[11] Patent Number: 5,108,021
[45] Date of Patent: Apr. 28, 1992

[54] CLEAVING TOOL FOR OPTICAL FIBERS

[75] Inventor: Joseph J. Vines, East Hartland, Conn.

[73] Assignee: Ensign-Bickford Optics Company, Avon, Conn.

[21] Appl. No.: 575,979

[22] Filed: Aug. 31, 1990

[51] Int. Cl.$^5$ .............................. G02B 6/25
[52] U.S. Cl. .......................... 225/2; 225/96; 225/100
[58] Field of Search .............. 225/2, 95, 96, 96.5, 225/104, 105, 100, 101

[56] References Cited

U.S. PATENT DOCUMENTS

| | | | |
|---|---|---|---|
| 4,154,385 | 5/1979 | Lewis | 225/2 X |
| 4,473,942 | 10/1984 | Ridgway | 225/2 X |
| 4,627,561 | 12/1986 | Balyasny et al. | 225/96 |
| 4,643,520 | 2/1987 | Margolin | 350/96.20 |
| 4,674,666 | 6/1987 | Balyasny | 225/96 |
| 4,688,707 | 8/1987 | Szostak et al. | 225/2 |
| 4,790,465 | 12/1988 | Fellows et al. | 225/96 X |
| 4,892,378 | 1/1990 | Zajac et al. | 350/96.20 |

Primary Examiner—Douglas D. Watts
Assistant Examiner—C. Dexter
Attorney, Agent, or Firm—Hayes & Reinsmith

[57] ABSTRACT

An optical fiber cleaving tool is disclosed having a frame with means for holding a fiber optic connector installed intermediate the length of an optical fiber against lengthwise movement, thereby providing a fixed fiber axis. A pair of selectively operable clamps are supported on the frame for engagement with the fiber at a location spaced from the connector, the clamps are further supported for slideable movement parallel to the fiber axis for placing a tension along the fiber axis to slightly enlongate the fiber. A pair of opposed, selectively operable fiber engaging members are supported on the frame for opposed engagement with the fiber, at least one of the members having a sharpened blade for scribing the fiber, the force placed on the fiber by one member being equal and opposite to the force placed on the fiber by the other member during scribing of the fiber for subjecting the fiber to zero torsion and zero bend stress. Crack propagation is induced through the thickness of the fiber at the scribe location by the axial tension on the fiber, thereby producing an end face on the fiber substantially perpendicular to the fiber axis, flush with the end of the connector, and having a suitable finish which does not require subsequent treatment to provide the desired smooth fiber end face.

19 Claims, 4 Drawing Sheets

5,108,021

CLEAVING TOOL FOR OPTICAL FIBERS

FIELD OF INVENTION

This invention relates generally to apparatus for cleaving optical fibers and more particularly to apparatus for providing a low loss, light transmitting end face on an optical fiber that is substantially perpendicular to the axis of the fiber and "flush" with the end of an optical fiber connector installed on the fiber.

BACKGROUND ON THE INVENTION

For efficient light transmission from a terminal end surface (end face) of an optical fiber, the end face should be flat, perpendicular to the axis of the fiber, and provided with a smooth finish to provide the maximum optical transmission area on the fiber end face and to minimize light losses resulting from reflection and refraction of the light.

As used herein, the term "optical fiber" refers to any known type of optical fiber having a light guiding core of glass, fused silica or other material capable of transmitting a light signal. The core is typically clad with a material having a lower index of refraction than the light-guiding core, thereby enabling non-parallel light rays to be reflected at the core/cladding interface and propagate through the length of the core. Typical cladding materials include glass and polymeric coatings.

Precision optical fiber connectors are used to effect alignment and abutting engagement of an optical fiber end face with a subsequent optical fiber or fiber optic device. As used herein, the term "optical fiber connector" is intended to refer to a terminal end connection for installation on the end of an optical fiber, typically comprising a ferrule mounted on the fiber against lengthwise movement and a fastening member to effect aligned connection of the ferrule and included fiber to an optical component or subsequent connector. Connectors are available having ferrules and fastening members of various sizes and shapes depending on the intended use of the connector. The terminal end of the ferrule aligned with the fiber end face is considered to be the "connector end".

OBJECTS OF THE INVENTION

It is a principal object of the invention to provide an improved cleaving tool for cleaving an optical fiber to form an end face on the fiber substantially flush with the end of a connector installed on the fiber, which end face is substantially perpendicular to the axis of the fiber and does not require subsequent treatment to provide the desired smooth face.

It is a another object of the invention to provide a cleaving tool for cleaving optical fibers of various diameters wherein a light transmitting end face is formed on the fiber which minimizes light losses resulting from reflection and refraction of light.

It is a further object of the invention to provide a cleaving tool for reliable cleaving of any known type of optical fiber with or without a surrounding cladding of any known type.

It is another object of the invention to provide an improved cleaving tool that is economical to manufacture and facile in its use.

Other objects of the invention will be in part obvious and in part pointed out in more detail hereinafter.

A better understanding of the objects, advantages, features, properties and relations of the invention will be obtained from the following detailed description which sets forth illustrative embodiments indicative of the various ways in which the principles of the invention are employed.

SUMMARY OF THE INVENTION

A cleaving tool constructed according to the present invention comprises, in its preferred embodiment, a frame having means for holding an optical fiber at a first location against lengthwise movement for providing a fixed fiber axis; a pair of selectively operable clamps supported on the frame for engagement with the fiber at a second location spaced from the first location, the clamps being further supported for slideable movement parallel to the fiber axis to place a tension along the fiber axis to slightly elongate the fiber; and a pair of opposed, selectively operable fiber engaging members supported on the frame for opposed engagement with the fiber, at least one of the members having a sharpened blade for scribing the fiber, the force placed on the fiber by one member being equal to the force placed on the fiber by the other member during scribing of the fiber for subjecting the fiber to zero torsion and zero bend stress.

In further accord with the invention, a mechanism is supported on the frame for operating the clamps for engaging and slightly enlongating the fiber and for thereafter operating the fiber engaging members for scribing the fiber under zero torsion and zero bend stress.

In still further accord with the invention, means are provided on the frame for holding a fiber optic connector installed intermediate the length of an optical fiber against length wise movement and for positioning a free end of the fiber extending from an end of the connector between the clamps and the engaging members with the connector end substantially flush with the blade, whereby the fiber is cleaved substantially flush with the connector end upon operation of the cleaving tool.

According to a method of the invention, a frame is provided having means for supporting a connector installed on a fiber against length wise movement; the fiber is placed under an axial tension; a pair of selectively operable engaging members are provided on the frame for opposed engagement with the fiber substantially flush with the connector end, at least one of the members having a sharpended blade tip for scribing the fiber; and the engaging members are simultaneously operated to place equal force on the fiber during scribing of the fiber surface, whereby the axial tension induces crack propagation through the thickness of the fiber at the scribe location.

DESCRIPTION OF A PREFERRED EMBODIMENT

The cleaving tool of the present invention is particularly well suited for cleaving an optical fiber substantially flush with the end of an optical connector installed on the optical fiber. The cleaving tool cleaves the fiber slightly elongated by axial tension while under zero torsion and zero bend stress, thereby producing an end face on the fiber substantially perpendicular to the axis of the fiber having a finish which does not require subsequent treatment.

Figure 1:
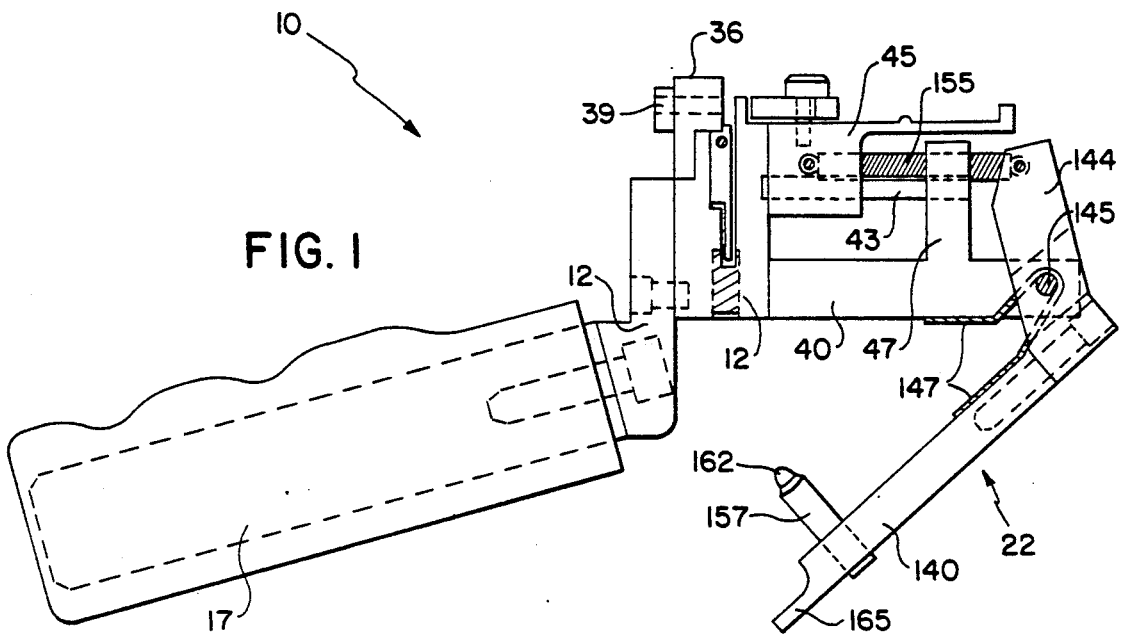
FIG. 1 is a side view of a cleaving tool of the present invention.

Referring to FIG. 1, the cleaving tool 10 of the invention includes a frame 12 having a fiber tensioning mechanism 20 and a cleaving mechanism 11. The frame 12 is supported for operation on an operator engageable handle 17, and in the preferred embodiment the handle 17 is mounted at an angle with respect to the frame 12 for ease of operation.

Figure 3:
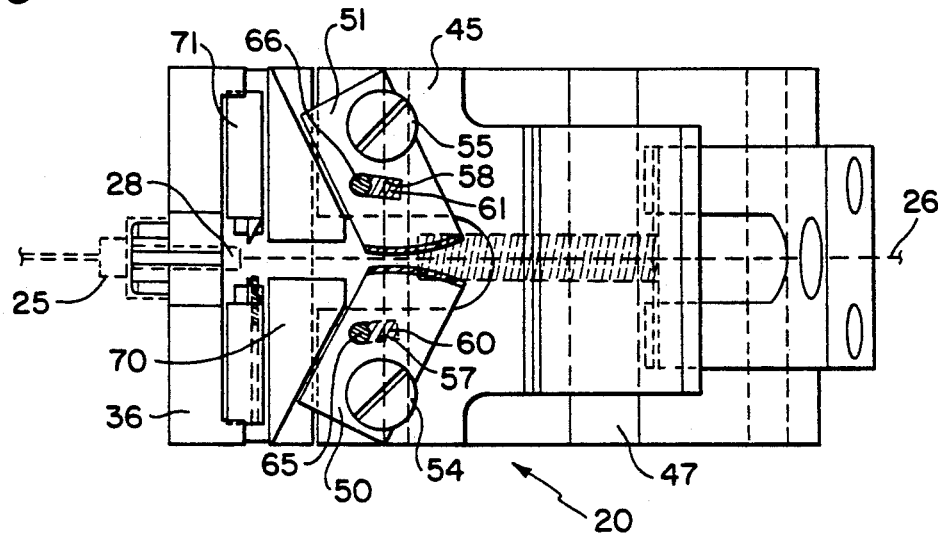
FIG. 3 is a top view of the cleaving tool of FIG. 1 with an optical fiber and connector being shown in phantom.

Referring to FIGS. 1 and 3, a connector 25 installed on an optical fiber 26 is held against length wise movement by an interchangeable connector positioning plate 36, removably mounted to the frame 12 by suitable fastening means. An aperture 39 is formed in the plate 36 to receive the body of the connector 28, e.g., the ferrule, and the plate 36 and aperture 39 cooperate to hold the connector 25 and fiber 26 in a fixed, axial extending position with the end of the connector adjacent to the cleaving mechanism 11 (FIG. 6) for cleaving the optical fiber substantially flush with the connector end.

Figure 4:
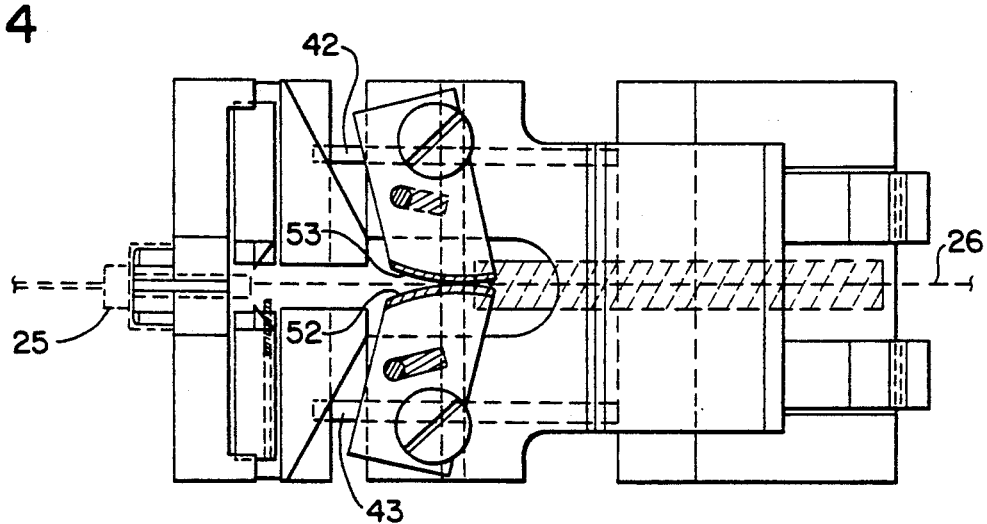
FIG. 4 is a top view of the cleaving tool of FIG. 3 showing a fiber tensioning mechanism placing the optical fiber under axial tension.

The tensioning mechanism 20 of the invention places the fiber 26 under an axial tension to thereby slightly elongate the fiber prior to cleaving. Referring more particularly to FIGS. 1, 3 and 4, the tensioning mechanism 20 comprises a support member 40 mounted to the frame 12 and having a rail support 47 which cooperates with the housing to support a pair of rails 42, 43 in a generally parallel relationship to the axial extending position of the fiber and connector.

To effect fiber clamping and tensioning, a clamping block 45 is supported for slideable movement on the rails 42, 43, and a pair of clamps 50, 51 are mounted for pivotal movement on the block 45 for opposed engagement with the fiber 26. In the preferred embodiment, shoulder screws 54, 55 are received through apertures (not shown) in the clamps 50, 51 and are engaged with the threads of apertures (not shown) in the block 45 to effect pivotally mounting the clamps to the block. A pair of recesses 57, 58 are formed in the block 45 for receiving a pair of corresponding bias springs 60, 61, and a bias pin 65, 66 in each clamp 50, 51 extends into one of the recesses 57, 58 for engagement with one of the springs 60, 61. The springs 60, 61 impose a spring force on the pins 65, 66 to effect a clamping action, forcing the clamps 50, 51 to pivot into the fiber engagement position shown in FIGS. 4 and 5. Gripping material 52, 53 (FIG. 4) is preferably affixed to the end of each clamp 50, 51 to securely grip the fiber in the fiber engagement position.

A pair of angled tabs 70, 71 formed on the frame 12 engage the clamps 50, 51 when the block 45 is adjacent to the frame 12, and the tabs cause the clamps 50, 51 to pivot about the shoulder screws 54, 55 against the bias spring pressure 60, 61, thus forcing the clamps into the fiber disengagement position shown in FIG. 3.

Figure 2:
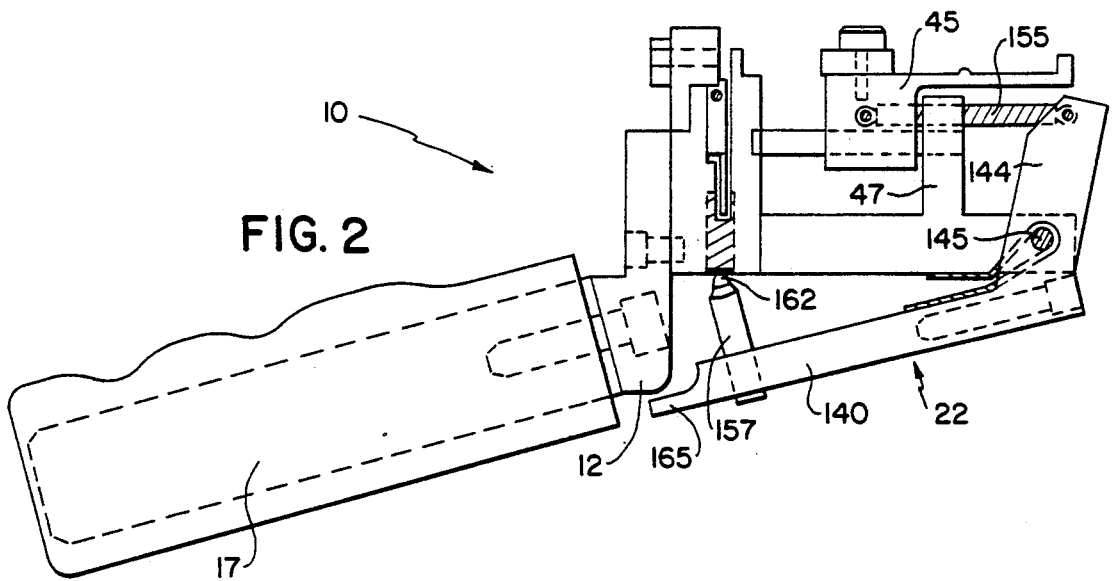
FIG. 2 is a side view of the cleaving tool of FIG. 1 with an actuator of the tool shown in its actuation position.

An actuator mechanism 22 of the invention is particularly well suited to operate the fiber tensioning mechanism 20 prior to operating the fiber cleaving mechanism 11. Referring more specifically to FIGS. 1 and 2, the actuator mechanism 22 comprises an operable trigger 140 and trigger extension 144 pivotally mounted to the support member 40 on a pivot axis defined by pin 145. A torsion spring 147 is received over pin 145, and the spring ends engage the support member 40 and trigger 140 for applying a spring force to cause the trigger 140 and trigger extension 144 to pivot about the pin 145 until the trigger extension 144 contacts the rail support 47. An interchangeable tension spring 155 is fixed at one end to the block 45 and at an opposing end to the trigger extension 144, thereby interconnecting the clamping block and trigger extension.

As in understood from the above described construction, when the trigger extension 144 is pivoted towards the rail support 47 by the spring force of the torsion spring 147, the block 45 is held against the frame 12 by the compressed tension spring 155. Tabs 70, 71 on the frame 12 thereby engage the clamps 50, 51 to force them into the fiber disengagement position (FIGS. 1, 3). When actuation force is applied to pivot the trigger 140 and trigger extension 144 about the pin 145, the force is transferred to the block 45 by spring 155 causing the block 145 to slide on the rails 42, 43 towards the rail support 47. The tabs 70, 71 control the pivotal movement of the clamps 50, 51 so that the clamps engage and hold the fiber in axial alignment with the connector 25 and continued movement of the block 45 on the rails 42, 43 axially tensions the fiber to slightly elongate or stretch the fiber (FIG. 4). The amount of tension placed on the fiber is controlled by the size and elasticity of the tensioning spring 155. For small fibers, a small, elastic spring 155 is used to prevent severing of the fiber in an undesirable location due to high tensile stress. For larger fibers, a large spring is required to ensure that the fiber is slightly elongated prior to cleaving.

Figure 6:
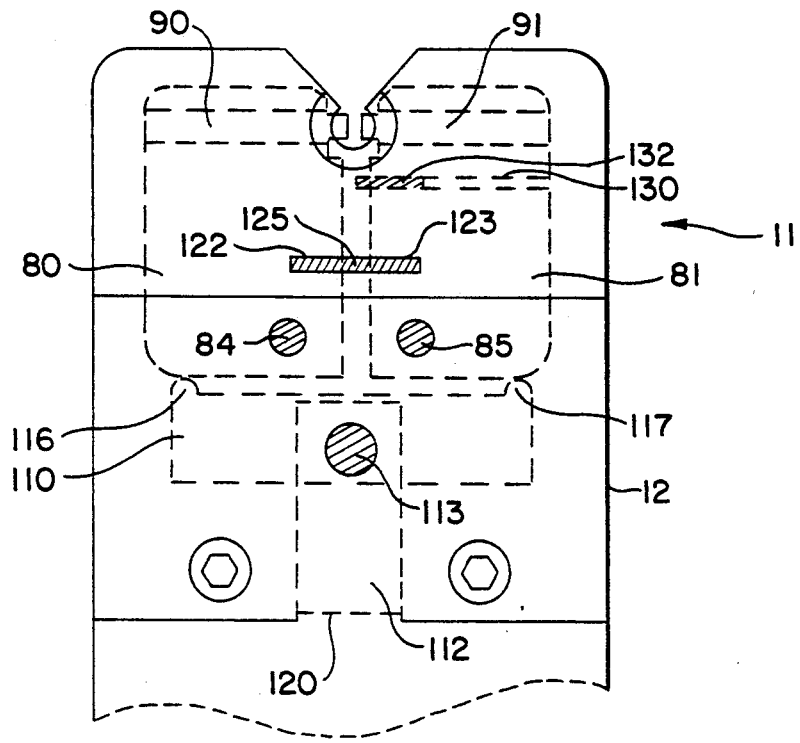
FIG. 6 is a front view of the cleaving tool of FIG. 1 with the fiber cleaving mechanism being shown in phantom.

The fiber cleaving mechanism 11 of the cleaving tool 10 cleaves the fiber 26 while under axial tension without placing the fiber under torsion or bend stress. The resultant fiber end face is substantially perpendicular to the axis of the fiber, and has a finish that does not require subsequent treatment to provide the desired smooth end face. Referring to FIGS. 1 and 6, the cleaving mechanism comprises a pair of levers 80, 81 supported in mirror-image relation to one another for pivotal movement on a pair of pivot pins 84, 85 within the frame 12. Each lever 80, 81 is suitably configured to support a fiber engaging member 90, 91 for diametrically opposed engagement with the fiber adjacent the end of the connector 28. Additionally, each lever 80, 81 may slightly move in an axial direction on the pivot pins 84, 85 to adjust in response to variations in the length of the ferrule 28.

Figure 8:
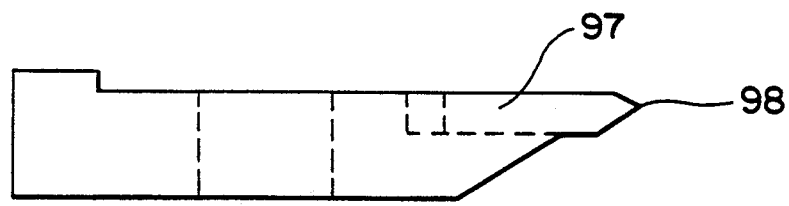
FIG. 8 is the side view of a fiber engaging member of the cleaving mechanism of FIG. 6 having a sharpened blade tip.
Figure 9:
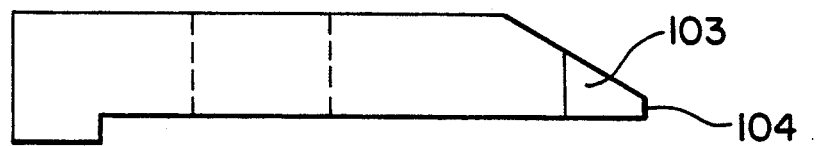
FIG. 9 is a side view of a fiber engaging member of the cleaving mechanism of FIG. 6 having a blunt anvil tip.

Referring to FIG. 8, at least one of the members 90, 91 comprises a scriber blade 97 having a sharpened tip 98. The tip 98 is sufficiently sharp to scribe an optical fiber. As used herein, the term "scribe" refers to a score or scratch in the surface of a glass clad optical fiber, or a cut through a polymer cladding and score or scratch in the fiber core surface, wherein crack propagation is induced at the scratch or score location through the thickness of a fiber under axial tension. In FIG. 9, an engaging member is shown comprising an anvil 103 having a blunt surface 104 for contacting a fiber without scribing the fiber surface. Although the invention is illustrated having a blade and opposing anvil, the invention would work equally as well with a pair of opposing blades.

Referring again to FIGS. 6 and 7, the levers 80, 81 are engaged by lifting tabs 116, 117 formed on a floating swivel plate 110 mounted for sliding movement within the frame 12. The swivel plate 110 is also mounted for pivotal movement to a plunger 112 by a dowel 113. The cleaving mechanism is activated by applying a force to the bottom surface 120 of the plunger 112 which force is transferred by the swivel plate tabs 116, 117 to the levers 80, 81 for pivoting the levers about the pivot pins 84, 85. The unique floating arrangement of the swivel plate 110 on the plunger 112 forms a compensating linkage which ensures that the force exerted on the plunger bottom surface 120 is equally divided between the levers 80, 81. Therefore, during activation of the cleaving mechanism, the blade tip 98 and the anvil blunt surface 104 place equal and opposite forces on the fiber, thereby placing the fiber under zero torsion and zero bend stress during cleaving. The floating arrangement also allows the cleaving mechanism to work equally as well over a wide range of fiber diameters, e.g., fibers having a diameter in the range of 100 to 1050

A pair of aligned, opposing recesses 122, 123 are formed in the levers 80, 81 for receiving a return spring 125 therebetween. The spring 125 opposes the force of the plunger 112, thereby separating the levers when no force is exerted on the plunger. Additionally, an aperture 130 is formed in one lever 81 for receiving a set screw 132. The set screw 132 is positioned between the levers to contact the other lever 80 during activation of the cleaving mechanism to prevent the blade tip 98 from contacting the anvil blunt surface 104, thereby extending the life of the blade 97.

Figure 7:
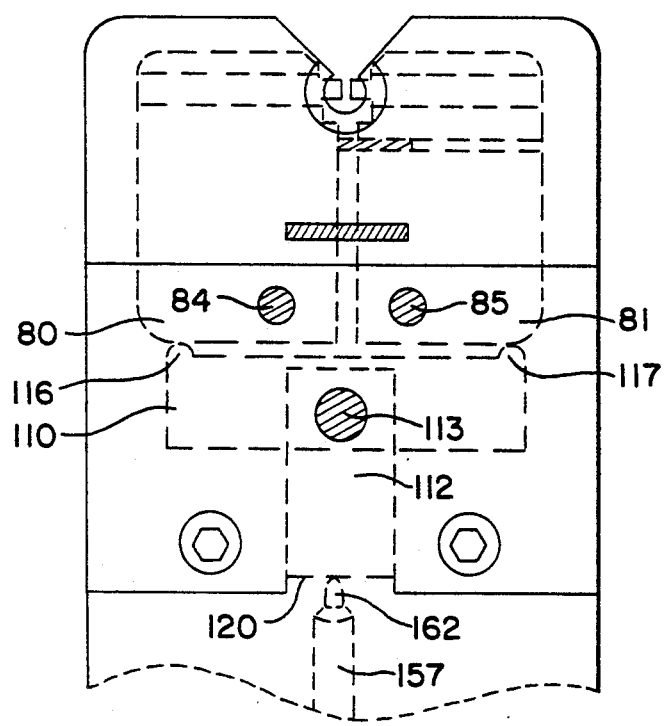
FIG. 7 is a front view of the cleaving tool of FIG. 6 showing the fiber cleaving mechanism being operated.

Referring to FIGS. 1, 2 and 7, the cleaving mechanism 11 is activated by an adjustable operating plunger 157 mounted on the end of the trigger 140 for engagement with cleaving mechanism plunger 112. A spring-loaded retractable tip 162 is preferably formed on the end of the operating plunger 157 to retract in response to additional force applied to the trigger 140 after the set screw 132 in the one lever 81 contacts the other lever 80. Additionally, the frame 12 engages an end of the trigger 165, thereby acting as a stop to limit the travel of the trigger 140. The position of the operating plunger 157 is adjusted to ensure sufficient contact with the cleaving mechanism plunger 112 for proper operation of the cleaving mechanism 11 while ensuring that the retractable tip 162 does not bottom out prior to contact of the end of the trigger 165 with the frame 12.

The adjustability of plunger 157 is achieved by any suitable means such as a threaded connection between trigger 140 and plunger 157 as seen in FIG. 2.

The operation of the invention is best understood by example. The handle is gripped with the operator's thumb free, the connector 25 is carefully inserted into the plate 36 until it bottoms out, and the length of fiber 26 extending from the end of the connector is positioned between the clamps 50, 51.

The operator then presses on the trigger 140 with his/her thumb, activating the tensioning mechanism 20. Referring to FIG. 4, the force of the operator's thumb is transferred to the clamping block 45 by tensioning spring 155, thereby causing the block 45 to slide on the rails 42, 43 towards the rail support 47. As described herein, the clamps 50, 51 pivot to contact the fiber in axial alignment with the connector 25 and continued movement of the trigger 140 places the fiber under an axial tension, thereby slightly elongating the fiber.

The tensioning spring 155 will deflect or stretch when the axial tension on the fiber exceeds the spring force or elasticity of the spring, thereby limiting the amount of axial tension on the fiber to the spring force of the tensioning spring 155. The greater the force required to deflect or stretch the spring 155, the greater the tension placed on the fiber.

Figure 5:
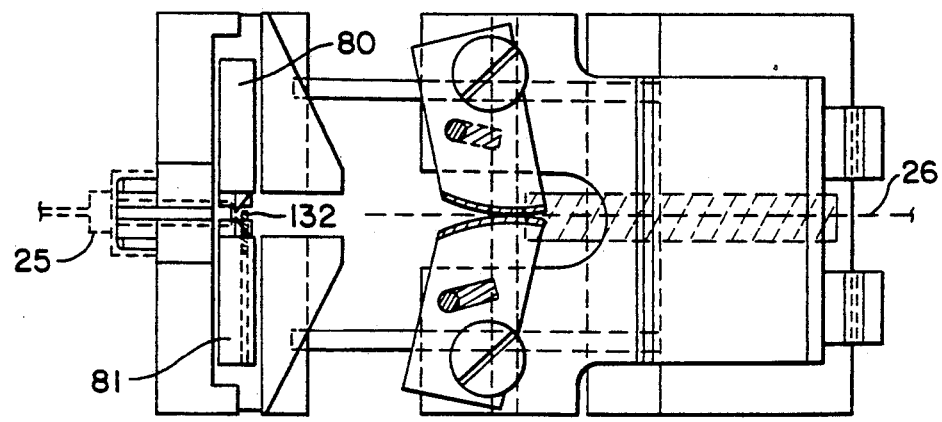
FIG.5 is a top view of the cleaving tool of FIG. 3 showing the fiber cleaved flush with an end of the connector.

Referring to FIGS. 2, 5 and 7, continued movement of the trigger 140 will cause the operating plunger tip 162 to contact the cleaving mechanism plunger bottom surface 120. The force is equally divided between the levers 80, 81 by the pivot plate 110, and the levers 80, 81 pivot about the pivot pins 84, 85 until the blade tip 98 and anvil blunt surface 104 contact the fiber 26 flush with the end of the connector 25. The blade tip 98 and anvil blunt surface 104 place an equal and opposite force on the fiber so that the fiber is subject to zero torsion and zero bend stress while being scribed by the blade tip 98. Crack propagation is induced through the thickness of the fiber 26 at the scribe location due to the axial tension on the fiber (FIG. 5).

The set screw 132 prevents the blade tip 98 from contacting the anvil 103, and upon release of the trigger 140, the torsion spring 147 forces the trigger back into its original position (FIG. 1) and the tensioning spring 155 pushes the clamping block 45 towards the frame 12. The housing tabs 70, 71 pivot the clamps 50, 51 into the fiber disengagement position (FIG. 3), and the return spring 125 forces the levers 80, 81 to pivotally return to their original separation position (FIG. 6).

To effect a cleaving tool 10 of structural integrity and simplicity of design thereby to minimize manufacturing cost and further enhance durability and usage, the cleaving tool should be manufactured on a high strength, light weight and durable material such as an aluminum alloy.

The invention is illustrated as being used with a fiber having a connector installed intermediate its length; however, the invention will work equally as well with a fiber not having a connector installed which is directly held against length wise movement by the positioning plate.

Although the invention has been illustrated and described with respect to exemplary embodiments thereof, it should be understood by those skilled in the art that the foregoing and various other changes, omissions and additions may be made therein and thereto, without departing from the spirit and scope of the invention.

We claim:

1. Apparatus for cleaving an optical fiber, comprising:
   a support frame;
   means on said frame for holding the fiber at a first location against length wise movement for providing a fixed fiber axis;
   a pair of selectively operable clamps supported on said frame for engagement with the fiber at a second location spaced from said first location, said clamps being further supported for slideable movement parallel to the axis of the fiber for axially tensioning the fiber; and a pair of selectively operable movable fiber engaging members supported on said frame for opposed engagement with the fiber, at least one of the members having a sharpened blade tip for scribing the fiber, the force placed on the fiber by one member being equal and opposite to the force placed on the fiber by the other member during scribing of the fiber for subjecting the fiber to zero torsion and zero bend stress, whereby said axial tension induces crack propagation through the thickness of the fiber at the scribe location.

2. Apparatus according to claim 1 further comprising a mechanism for operating said clamps and for thereafter operating said engaging members.

3. Apparatus according to claim 2 further comprising: rails on said frame; and a clamping block supported on said rails for slidable movement parallel the axis of the fiber, said clamps being supported on said block for engagement with the fiber.

4. Apparatus according to claim 3 wherein said fiber engaging members comprise a pair of levers supported for pivotal movement on said frame for opposed engagement with the fiber, at least one of said levers having a sharpened blade tip for scribing the fiber.

5. Apparatus according to claim 4 wherein said levers are interconnected by a pivotal drive plate, said plate being driven by a drive pin to effect partial rotation of said levers for engagement with the fiber.

6. Apparatus according to claim 5 wherein the apparatus comprises means for cleaving fiber with a diameter in the range of 100 to 1050 micrometers.

7. Apparatus according to claim 5 wherein said mechanism comprises:

a manually operable trigger supported for pivotal movement on said frame, said trigger being in operative engagement with said clamping block for tensioning the fiber during operation of said trigger; and a plunger on said trigger for contacting said drive pin after the fiber is tensioned.

8. Apparatus according to claim 7 wherein said operative engagement between said trigger and said clamping block comprises a spring fixed at one end to said trigger and fixed to an opposing end to said clamping block.

9. Apparatus according to claim 7 further comprising spring loading means on said clamping block in operative engagement with said clamps, said spring loading means pivoting said clamps for engagement with the fiber.

10. Apparatus according to claim 9 further comprising tabs on said frame for pivoting said clamps to disengage the fiber.

11. Apparatus according to claim 5 further comprising a return spring disposed between said levers for opposing the force applied to said drive pin to partially rotate said levers.

12. Apparatus according to claim 4 further comprising a stop between said levers to prevent said fiber engaging members from contacting one another.

13. Apparatus according to claim 1 further comprising an operator engageable handle mounted on said frame.

14. Apparatus for cleaving an optical fiber substantially flush with an end of a connector installed on the fiber, comprising:

a frame having means for supporting the connector against lengthwise movement for providing a fixed fiber axis;

selectively operable fiber tensioning means on said frame for axially tensioning the fiber; and means on said frame for scribing the axially tensioned fiber substantially flush with the end of the connector while subjecting the fiber to zero torsion and zero bend stress.

15. The fiber cleaving tool of claim 14 wherein said tensioning means comprises a pair of opposed, selectively operable clamps supported on said frame for engagement with the fiber at a location spaced from said connector, said clamps being further supported for slideable movement parallel the axis of the fiber for axially tensioning the fiber.

16. The fiber cleaving tool of claim 15 wherein said means for scribing comprises a pair of selectively operable engaging members supported on said frame for opposed engagement with the fiber, at least one of the members having a sharpened blade tip for scribing the fiber, the force placed on the fiber by one member being equal and opposite to the force placed on the fiber by the other member during cleaving for subjecting the fiber to zero torsion and zero bend stress, whereby said axial tension induces crack propagation through the thickness of the fiber at the scribe location.

17. Apparatus according to claim 15 wherein said engaging members are further supported for slideable movement in an axial direction for cleaving the fiber substantially flush with the end of the connector.

18. A method of cleaving an optical fiber substantially flush with an end of a connector installed on the fiber comprising the steps of:

providinng a support frame having means for supporting the connector against length wise movement in a fixed fiber axis position;

supporting the connector on said frame in the fixed fiber axis position;

placing an axial tension along the axis of the fiber, thereby slightly elongating the fiber;

providing a pair of selectively operable engaging members supported on said frame for opposed engagement with the fiber substantially flush with an end of the connector, at least one of the members having a sharpened blade tip for scribing the fiber; and simultaneously operating said engaging members to place an equal and opposite force on the fiber for subjecting the fiber to zero torsion and zero bend stress while being scribed by said blade tip, whereby said axial tension induces crack propagation through the thickness of the fiber at the scribe location.

19. The method of claim 18 including providing a pair of selectively operable clamps supported on said frame for engagement with the fiber at a location spaced from the connector, said clamps being further supported for slideable movement parallel to the axis of the fiber for placing an axial tension on the fiber.

* * * * *

UNITED STATES PATENT AND TRADEMARK OFFICE
CERTIFICATE OF CORRECTION

PATENT NO. : 5,108,021
DATED      : April 28, 1992
INVENTOR(S) : Jay Vines

It is certified that error appears in the above-indentified patent and that said Letters Patent is hereby corrected as shown below:

Column 4, line 25 "in" should be --is--.

Column 5, line 32 --micrometers.-- should be added after "1050".

Column 6, line 44 "on" should be --of--.

Signed and Sealed this

Twenty-sixth Day of October, 1993

Attest:

Attesting Officer

BRUCE LEHMAN

Commissioner of Patents and Trademarks